(No Model.)
J. RIGBY.
PROCESS OF TREATING IRON.
No. 360,620. Patented Apr. 5, 1887.
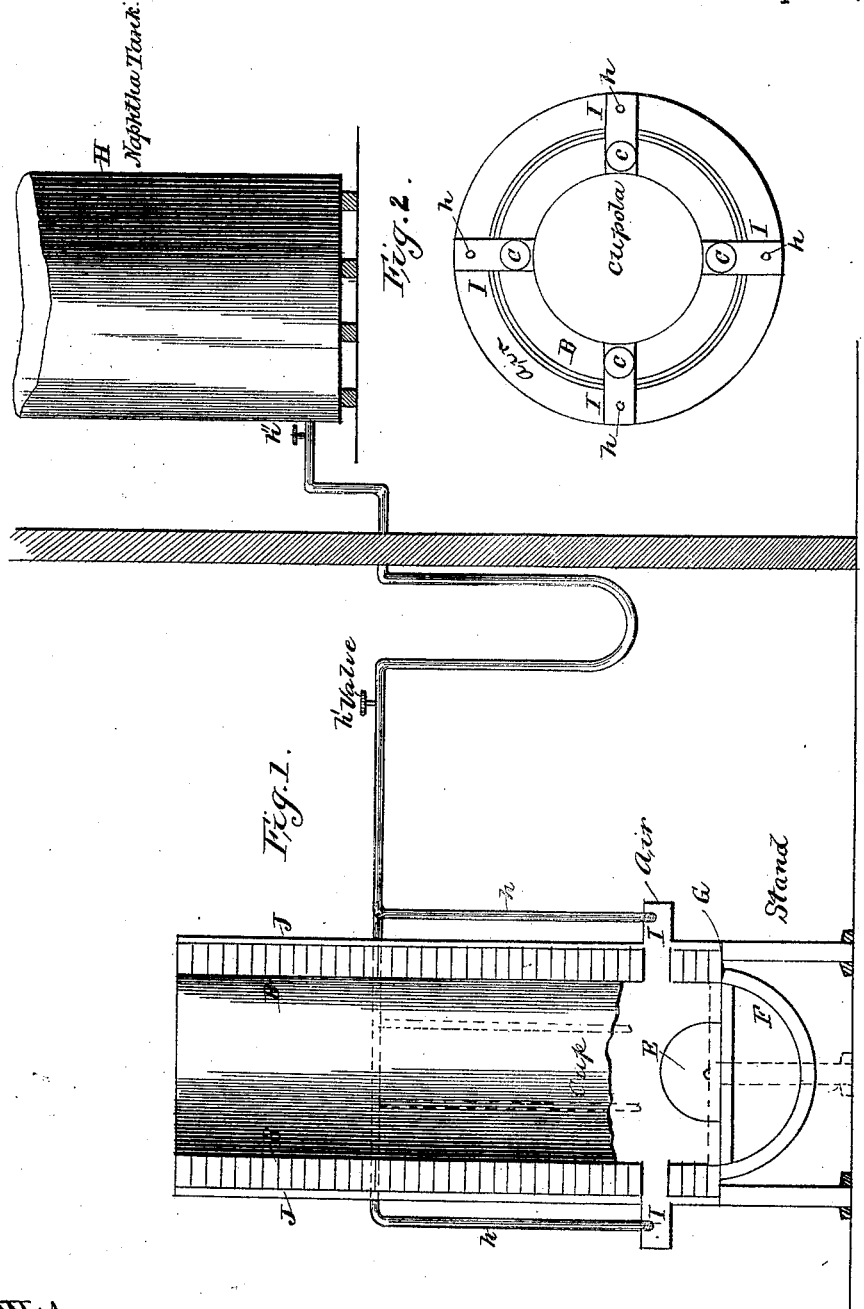
Witnesses
R. C. Laurie
H. R. Leesnitzer
Inventor
James Rigby
Chas. E. Barbur
atty.

UNITED STATES PATENT OFFICE.

JAMES RIGBY, OF MINNEAPOLIS, MINNESOTA.

PROCESS OF TREATING IRON.

SPECIFICATION forming part of Letters Patent No. 360,620, dated April 5, 1887.

Application filed March 15, 1886. Serial No. 195,230. (No model.)

*To all whom it may concern:*

Be it known that I, JAMES RIGBY, a citizen of the United States, residing at Minneapolis, in the county of Hennepin, State of Minnesota, have invented certain new and useful Improvements in Process of Treating Iron, of which the following is a specification, reference being had therein to the accompanying drawings.

The object of my invention is to produce a new and improved article of commerce and manufacture to be used in the construction of car-wheels and other similar articles where great strength and elasticity are required.

Another object of my invention is to utilize waste or scrap iron to manufacture these articles.

Still another object of my invention is to so manipulate this waste or scrap iron that it may be used in substantially the same manner as cast-iron has been used heretofore; and the invention consists in the novel method of treating and fusing the metal, as will be hereinafter fully described, and particularly pointed out in the claim at the end of the specification.

The method of treating the scrap or waste iron is to build up the furnace in the usual manner with wood and fuel, the iron being put into the cupola in the regular form of building up a cupola. When the iron has commenced to fuse, a spray of naphtha is injected into the blast, and at once increases the intense heat of the blast, so that it causes the waste wrought-iron to fuse in the manner of common pig-iron. By that means I get the iron to flow readily, so that I can make good and sufficient castings from old scrap wrought-iron.

In the accompanying drawings, Figure 1 represents a cupola of an ordinary construction provided with my improved apparatus for injecting the naphtha. Fig. 2 is a top plan view of the cupola, showing the pipes or openings for the injection of naphtha into the blast.

A designates the cupola, which is constructed in the usual manner, and is supported by the standards C.

F designates the bottom, which is hinged in the usual manner at G.

E designates the draw.

The injectors $h$ $h$ $h$ $h$ enter the air-space I at four points around the cupola.

The flow of the naphtha is controlled by the valves $h'$ and $h''$. The cupola is lined with bricks B, and is provided with an outer casing of iron, J, in the usual manner.

The manner of injecting the naphtha consists in providing an indirect siphon, and the flow of the naphtha is controlled by the valves and the liquid pressure of the naphtha in the tank H. It will be observed that by this novel means of introducing the naphtha into the air-space I it flows into the blast by its own gravity, and is carried by the blast through the particles of iron, and the naphtha serves to increase the intensity of its heat to such an extent that the scrap-iron is readily melted into as perfect a liquid state as can be obtained by using pig-iron for ordinary castings.

My reason for using naphtha is as follows: Hydrocarbon may be of any low refuse, such as coal-tar or petroleum-tar, or any thick oily fatty matter of any kind which contains heavy hard carbon, which will injure the metal and make it hard and brittle; but naphtha is a refined article of commerce which contains only a small percentage of heavy carbon, and is well adapted for the purpose to which I have applied it, for its intense heat, cleanliness, and ready flow through the pipes into the blast.

In the accompanying drawings I have shown four injectors; but it is quite obvious that the number of these injectors may be increased or decreased at will without in any manner departing from the spirit of my invention; and I do not wish to be understood as limiting myself to the exact construction herein described, as it is obvious that several minor details may be varied at will without in any way departing from or interfering with the utility of my invention.

It will of course be understood by those skilled in the art that additional solid fuel will be required to be used in conjunction with the jets of naphtha to prevent oxidation and burning, as well as to prevent the escape of the heat of the burning naphtha in sparks, as would be the case if it were used alone.

It is quite apparent that steel may be treated in this way as well as iron, and, as I design in some instances to treat steel this way, I do not wish to be understood as limiting myself to the use of iron alone.

I am aware that liquid hydrocarbons have been used in connection with a cupola-furnace, and I also know that it is not broadly new to melt up scrap-iron. I also know that scrap iron and steel have been used for castings, but in crucibles for small castings, and that was my method formerly while experimenting, all of which I disclaim in this application.

Having now described my invention, and having illustrated one means of carrying the same into practice, what I desire to secure by Letters Patent, and what I therefore claim, is—

The herein-described process of melting and treating wrought-iron scraps or wrought-iron of any description, which consists in placing the scrap-iron and suitable solid fuel in the cupola and then injecting naphtha into the air-space with the blast, substantially as described.

In testimony that I claim the above I hereunto set my hand in presence of two witnesses.

JAMES RIGBY.

Witnesses:
RICHARD C. LAURIE,
CHAS. E. BARBER.